Aug. 26, 1947.  B. J. FLAGEOLE  2,426,444
COMB
Filed March 6, 1945

Inventor
Burchard J. Flageole,

Patented Aug. 26, 1947

2,426,444

UNITED STATES PATENT OFFICE 2,426,444

COMB

Burchard J. Flageole, Chicago, Ill.

Application March 6, 1945, Serial No. 581,233

1 Claim. (Cl. 132—20)

The present invention relates to new and useful improvements in combs of a type adapted to be worn in the hair and the invention has for its primary object to provide means for supporting an ornament at the back of the comb while being worn.

More specifically, the invention comprises an elongated chamber formed in the comb and adapted to contain water and also adapted to receive the stem of a flower immersed in the water so that flower will be kept in a fresh condition.

A further object is to provide an article of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
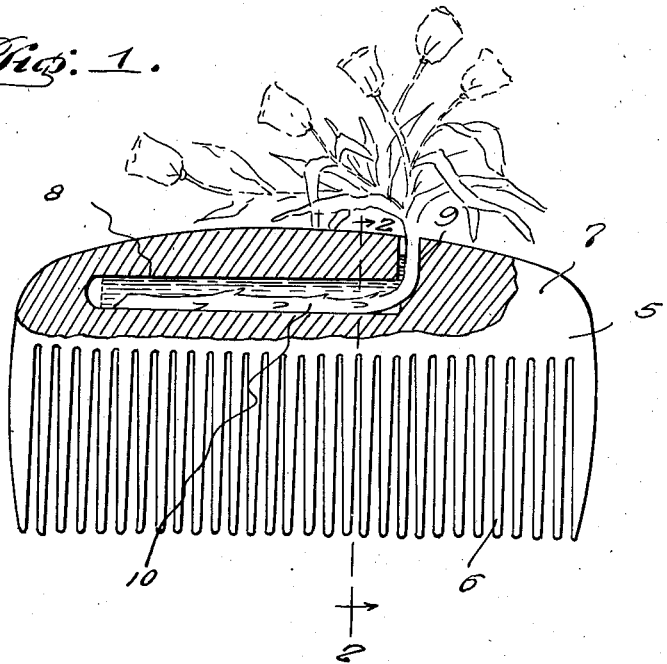
Figure 1 is a front elevational view with parts broken away and shown in section.

Referring now to the drawing in detail wherein for the purpose of illustration I have disclosed a preferred embodiment of the invention, the numeral 5 designates a comb of conventional construction and including the teeth 6 at one edge and a back 7 along its opposite edge.

A longitudinally extending chamber 8 is formed in the back 7 of the comb, the chamber being closed at one end and having a lateral passage 9 communicating therewith at its outer end, the passage extending through the back edge of the comb in order that the chamber 8 may be supplied with water.

The passage 9 is also adapted to receive the stem 10 of a flower for extending into the chamber 8 to be immersed in the water therein, as will be apparent from an inspection of Figure 1 of the drawing.

Figure 3:
Figure 3 is a top plan view showing the comb in its vertical curved position to constrict the passage.
Figure 4:
Figure 4 is a similar view showing the comb held in a straight position to open the passage.
Figure 2:
Figure 2 is a vertical sectional view taken substantially on a line 2—2 of Figure 1.

The comb 5 is normally curved as indicated in Figure 3 of the drawing whereby the passage 9 is constricted into tight gripping engagement with the stem 10 of the flower whereby the stem will function as a plug for the passage 9 to prevent escape of water from the chamber 8. However, when the comb is straightened as shown in Figure 4 of the drawing the passage 9 will be open to its fullest extent so as to permit insertion and removal of the stem 10 of the flower therefrom.

Having thus described the invention, what I claim is:

A comb having a chamber extending longitudinally therein and a restricted elongated opening communicating with one end of the chamber and extending outwardly through an edge of the comb and adapted to receive water and also adapted to receive the stem of a flower for immersion in the water in the chamber, said comb being of resilient material and normally curved and said opening extending longitudinally of the comb whereby said opening is adapted to be enlarged upon a straightening of the comb by pressure of the fingers of a person exerted on the ends of the comb.

BURCHARD J. FLAGEOLE.

REFERENCES CITED

The following references are of record in the file of this patent:

UNITED STATES PATENTS

| Number | Name | Date |
|---|---|---|
| 1,204,230 | Abbate | Nov. 7, 1916 |
| 686,050 | Gillum | Nov. 5, 1901 |

FOREIGN PATENTS

| Number | Country | Date |
|---|---|---|
| 553,512 | France | Feb. 12, 1923 |